United States Patent Office 2,929,833
Patented Mar. 22, 1960

2,929,833

PROCESS OF PREPARING PHENYL DIMETHYL PHOSPHATES

Harold D. Orloff, Oak Park, Mich., and Francis X. Markley, Bound Brook, N.J., assignors to Ethyl Corporation, New York, N.Y., a corporation of Delaware No Drawing. Application April 23, 1958
Serial No. 730,273

3 Claims. (Cl. 260—461)

This invention relates to, and has as its principal object, the preparation of phenyl dimethyl phosphates.

Phenyl dimethyl phosphates having up to 3 methyl groups and up to 1 chlorine atom attached to the phenyl group are exceedingly useful as ignition control compounds when blended in small concentration with leaded gasoline. Prior to this invention, there were no published methods of making these compounds.

A theoretically possible reaction sequence for preparing these phosphates can be depicted as follows:

$$PhOPOCl_2 + CH_3OH \rightarrow$$
$$(CH_3O)(PhO)POCl + HCl \quad (I)$$
$$(CH_3O)(PhO)POCl + CH_3OH \rightarrow$$
$$(CH_3O)_2(PhO)PO + HCl \quad (II)$$

However, in actual practice the by-product hydrogen chloride attacks the desired neutral ester product in a cleavage reaction from which a phosphoric acid and an alkyl halide are obtained.

$$(CH_3O)_2(PhO)PO + HCl \rightarrow$$
$$(CH_3O)(PhO)POOH + CH_3Cl \quad (III)$$

Reaction III is exceedingly rapid and thus this cleavage reaction exerts a profound influence upon the yield of the desired neutral ester. This is shown by kinetic studies of the cleavage reaction of phenyl dimethyl phosphates with dry hydrogen chloride in the absence of a solvent. The data are summarized in Table I.

TABLE I—*Rate of cleavage reaction*

| Run | Aryl Group | Temp., °C. | $10^5$ k., l. mole$^{-1}$ sec.$^{-1}$ |
|---|---|---|---|
| 1 | m-tolyl | 20.0 | 1.22 |
| 2 | ---do--- | 30.0 | 3.02 |
| 3 | ---do--- | 40.0 | 7.04 |
| 4 | ---do--- | 30.0 | 3.0 |
| 5 | 4-chloro-3-methyl phenyl | 30.0 | 1.5 |

It is seen that the reaction rate constants, expressed as liters mole$^{-1}$ seconds$^{-1}$, are quite high even at 20° C. and rise rapidly with increasing temperatures. Actually, the extent or rate of cleavage increases by a factor of 2.4 for every 10° C. rise in temperature.

The existence of this cleavage reaction is very serious because it imposes severe losses on the yield of the desired end product. Furthermore, if alkaline washes, such as aqueous caustic, are used in subsequent work-up procedures, very difficult emulsion problems are encountered because of the fact that metallic salts of the above phosphoric acid are potent surface active agents. In fact, the alkali metal salts act as solubilizers for the desired product in water with the result that the product may be completely dissolved during the washing operation.

From the foregoing it would appear that if reactions (I) and (II) were at all technically feasible, it would be necessary to use a stoichiometric amount of a tertiary amine base in order to take up the hydrogen chloride by-product, or to use low temperatures in the range of 10° C. or less in the hope of taking advantage of the lower rate of the cleavage reaction. Both of these approaches are highly undesirable. The use of a tertiary amine base is not only expensive but increases the difficulty of the separation problems. The use of very low reaction temperatures necessitates the use of cumbersome reaction equipment, such as refrigeration means, and is very costly in plant operation.

In spite of the above seemingly insuperable difficulties a process has now been discovered which makes highly effective use of reaction sequence (I) and (II). This process is readily conducted at room temperature—20° C. (68° F.)—and, in fact, can be conducted very easily in the range of 15° C. (59° F.) to 60° C. (140° F.). This novel process is exceedingly rapid and produces exceptionally high yields of the desired product through the substantial elimination of cleavage reaction (III).

This invention is a process of preparing phenyl dimethyl phosphates characterized by introducing into methanol a phenyl phosphorodichloridate having up to 3 methyl groups and up to 1 chlorine atom attached to the phenyl group, there being present throughout the entire reaction period from 4 to 8 (preferably 5 to 8) moles of methanol per mole of the phosphorodichloridate so introduced while keeping the temperature of the reaction mixture at 15 to 60° C. (preferably 25–30° C.), quenching the reaction mixture with water, separating the aqueous and organic phases and then recovering the phosphate from the organic phase.

A feature of this invention is that exceedingly high yields of the desired product are formed in very short reaction time. To illustrate, a series of reactions were carried out between 4-chloro-3-methylphenyl phosphorodichloridate and methanol. The effects of reaction time, reaction temperature and the ratio of methanol to the dichloridate on the yields of 4-chloro-3-methlphenyl dimethyl phosphate are shown in Table II.

TABLE II—*Effect of reaction variables*

| No. | Temp., °C. | Mole Ratio, MeOH: PhOPOCl$_2$ | Reaction Time, Hour | Percent of P–Cl Bonds Esterified | Yield of $(CH_3O)_2$ $(PhO)PO$, Percent |
|---|---|---|---|---|---|
| 1 | 10 | 2.7:1 | 0.5 | 21 | Less than 5. |
| 2 | 10 | 2.7:1 | 1.0 | 22 | Do. |
| 3 | 10 | 4:1 | 0.5 | 24 | Do. |
| 4 | 10 | 4:1 | 1.0 | 25 | Do. |
| 5 | 30 | 2.7:1 | 0.5 | 85 | 70. |
| 6 | 30 | 2.7:1 | 1.0 | 88 | 76. |
| 7 | 30 | 4:1 | 0.5 | 99 | 98. |
| 8 | 30 | 4:1 | 1.0 | 100 | 100. |

It is seen from Nos. 1–4 inclusive that at 10° C. the yields of product are low and that there is essentially no improvement achieved by going from a mole ratio (methanol:dichloridate) of 2.7:1—i.e., a 35 percent excess of methanol—to a mole ratio of 4:1, a 100 percent excess of methanol. Nos. 5 and 6 show that even at 30° C. a normal excess of methanol does not provide a satisfactory yield of product. However, Nos. 7 and 8 which are examples of the process of this invention result in essentially quantitative yields in very short reaction times.

Other runs on the process of this invention have given equally good results. For example, the introduction of m-tolyl phosphorodichloridate into methanol in a mole ratio of 1:4 respectively at 20° C. resulted in complete esterification in approximately one hour.

Another feature of this invention is the fact that the cleavage reaction discussed above is virtually eliminated as will be further apparent from the discussion of other experimental results hereinafter.

Still another feature of this invention is the fact that the critical excess of methanol completely eliminates evolution of hydrogen chloride gas. This in turn eliminates corrosion problems which normally occur when metallic reaction vessels are exposed to hydrogen chloride atmosphere, especially in the presence of small amounts of moisture.

The following examples further illustrate this invention. All parts and percentages are by weight.

EXAMPLE I

One-half mole (112.5 parts) of distilled m-tolyl phosphorodichloridate was fed over 50 minutes at 15° C. to 96 parts (3.0 moles) of methanol with constant stirring and external cooling. Provision was made to absorb any hydrogen chloride which evolved. Under the conditions employed, no hydrogen chloride was lost from the reaction solution. After the completion of the dichloridate feed, the reaction temperature was maintained for 75 minutes of "cook" time and then the reaction product was quenched in 300 parts of water, extracted with 55 parts of a 10 percent sodium hydroxide-10 percent sodium chloride solution, washed twice with 50-part quantities of 5 percent sodium chloride solution, freed of water under reduced pressure, filtered and weighed. The wash waters were extracted once with benzene and the ester recovered upon drying and evaporating the latter solution was added to the main portion of the product after the last wash. The 100.9 parts of recovered product amounted to a yield of 93.2 percent. As isolated in this fashion, the resulting m-tolyl dimethyl phosphate contained a trace of the sodium phosphate salt, approximately 0.5 percent calculated as $(CH_3O)(CH_3C_6H_4O)POONa$. To remove this impurity, the product was distilled and yielded a heart cut of 87.2 parts, B.P. 114° C. (1 mm.). Anal. calcd. for $C_9H_{13}O_4P$: carbon, 50.0; hydrogen, 6.02; phosphorous, 14.35. Found: carbon, 49.9; hydrogen, 61.; phosphorus, 14.3.

EXAMPLE II

Into a reaction vessel containing 65 parts of methanol (2.0 moles) was added 130 parts (0.5 mole) of 4-chloro-3-methylphenyl phosphorodichloridate over a 50-minute period. The temperature was held at 30° C. No evolution of HCl occurred. Then, the reaction mixture was cooked for 25 minutes at the same temperature and the product is then worked up as in Example I. A yield of 4-chloro-3-methylphenyl dimethyl phosphate of over 90 percent is achieved. This compound has a refractive index of $n_D^{20}$ 1.5074 and a boiling point of 131° C. at 0.75 mm. pressure.

EXAMPLE III

Charged to a reaction vessel containing 160 parts (5 moles) of methanol is 210 parts (1 mole) of phenyl phosphorodichloridate. The period of addition is one hour with the temperature being held at 25° C. The reaction mixture is then held at 25° C. for an additional 0.5 hour. No HCl is evolved. Next, the product is quenched in 600 parts of an aqueous 5 percent sodium chloride solution, the water layer is decanted off and then the organic layer is distilled at reduced pressure. A very good yield of phenyl dimethyl phosphate is recovered at 114° C. and 2 millimeters of mercury pressure. It has a boiling point of 150° C. at 20 millimeters pressure and an index of refraction of $n_D^{20}$ 1.4887.

EXAMPLE IV

Into a reaction vessel containing 256 parts (8 moles) of methanol is incrementally added 238 parts (1 mole) of xylyl phosphorodichloridate (mixed isomers). The addition time is 45 minutes, the temperature being held at 60° C. There is no HCl evolution. The reaction mixture is then quenched in 800 parts of a 5 percent sodium hydroxide—5 percent sodium chloride aqueous solution. The organic layer is then washed with 100 parts of water, dried by distillation at reduced pressure and the resultant organic product purified by vacuum distillation. A very good yield of xylyl dimethyl phosphate is recovered at 125° C. and 1.2 millimeters of pressure. This compound has a boiling point of approximately 177° C. at 20 millimeters and an index of refraction of $n_D^{20}$ 1.495.

As shown by the above examples, the separation and recovery of the desired product is best accomplished by quenching the reaction mixture with water which preferably contains sodium chloride and sodium hydroxide. Brine solutions containing from about 1 to about 10 percent by weight of sodium chloride and from 5 to about 20 percent of sodium hydroxide are excellent for this purpose. However, other alkali metal halides, such as sodium bromide, potassium chloride, etc., may be used. In place of sodium hydroxide, effective use can be made of lithium hydroxide, potassium hydroxide, rubidium hydroxide, cesium hydroxide, or mixed alkali metal hydroxides, although the cheapness and ready availability of sodium hydroxide make its use preferable.

Once the quenching step has been completed, the resulting aqueous and organic phases are separated by conventional means—settling and decantation, distillation, etc.—and then the desired product is recovered from the organic phase by the use of standard techniques, such as distillation at reduced pressure (150 to 225° C. at 10 to 30 mm. pressure), solvent extraction procedures, and the like.

Also shown by the foregoing examples is that excellent results are achieved when the process of this invention is applied to phenyl phosphorodichloridates made from simple monohydric phenolic compounds and ring-chlorinated derivatives thereof. Thus, effective use is made of phenyl phosphorodichloridates made from phenol, o-, m- and p-cresol, the various xylenols, trimethyl phenols, chlorophenols, chlorocresols, chloroxylenols, and chlorotrimethyl phenols. Mixtures of these as well as mixtures of phenolic compounds which are available as articles of commerce can also be used.

An excellent way of making the above phenyl phosphorodichloridates for use in this invention is to heat the appropriate phenol with phosphoryl chloride in a ratio of from 1 to about 2 moles of the chloride per mole of the phenol at about 85 to about 130° C. in the presence of a small, catalytic amount of aluminum chloride or metallic aluminum which has been rendered highly active by refluxing the same with phosphoryl chloride for at least one-half hour. The following example illustrates this procedure.

EXAMPLE V

Charged to an autoclave were 104.9 parts of phosphoryl chloride and 1.0 part of aluminum chloride. To this mixture was added 40.7 parts of a commercially-available cresylic acid (neutral equivalent; 119) over a period of 45 minutes, during which the temperature was held at 88 to 95° C. After this, the reaction mixture was cooked for 30 minutes at the same temperatures. Then, the excess phosphoryl chloride and HCl were stripped off at pressures less than 50 millimeters of mercury and at a maximum temperature of 160° C.

Formed was a high yield of a mixture of phenyl, cresyl, and xylyl phosphorodichloridates.

As noted above, the process of this invention is exceedingly rapid. Thus, when it is carried out on a small-scale, reaction times of 0.5 to about 2 hours can be used. When carrying out on a very large scale, it is seldom necessary to use a reaction time longer than about 8 hours. Generally, the higher the reaction temperature, the shorter should be the reaction time.

The introduction of the dichloridate into the methanol is best accomplished by metering the feed so that the temperature of the reaction is continuously within the range of 15 to 60° C. and preferably 25 to 30° C. This means of introduction can be in incremental portions or continuous. It is possible to charge the entire amount of the dichloridate into the methanol in one portion but this necessitates vigorous agitation and the use of external coolants so as to rapidly dissipate the heat of reaction.

The pre-eminence of the phenyl dimethyl phosphates as ignition control compounds was demonstrated by carrying out a series of fleet tests. Used were various modern automobiles equipped with 11:1 compression ratio engines. The cars were operated under standard driving conditions on a commercially-available gasoline containing 3 milliliters of tetraethyllead per gallon as standard motor mix (0.5 theory of bromine as ethylene dibromide and 1.0 theory of chlorine as ethylene dichloride) with which had been blended 1.04 milliliters per gallon of a mixture of tolyl dimethyl phosphate and xylyl dimethyl phosphate (mixed isomers in each instance). It was found that the spark plug life when using this treated fuel as measured by miles required to reach three spark plug failures per car was ten times as long as the spark plug life afforded by the same tests using the corresponding phosphate-free leaded gasoline.

What is claimed is:

1. A process of preparing phenyl dimethyl phosphates characterized by introducing into methanol a phenyl phosphorodichloridate having up to 3 methyl groups and up to 1 chlorine atom attached to the phenyl ring, there being present throughout the entire reaction period from 4 to 8 moles of methanol per mole of the dichloridate so introduced while keeping the temperature of the reaction mixture throughout the entire reaction period at 15 to 60° C., quenching the reaction mixture with water, separating the aqueous and organic phases and then recovering the phosphate from the organic phase.

2. The process of claim 1 further characterized in that there are from 5 to 8 moles of methanol per mole of the dichloridate.

3. The process of claim 1 further characterized in that there are from 5 to 8 moles of methanol per mole of the dichloridate and the temperature of the reaction mixture is kept at 25 to 30° C.

References Cited in the file of this patent

UNITED STATES PATENTS

| | | |
|---|---|---|
| 1,869,768 | Nicolai et al. | Aug. 2, 1932 |
| 2,759,962 | Zenftman et al. | Aug. 21, 1956 |

FOREIGN PATENTS

| | | |
|---|---|---|
| 713,757 | Great Britain | Aug. 18, 1954 |